March 1, 1966 H. B. ROSE 3,237,528
FLUID PRESSURE ROTARY VANE ACTUATOR
Filed Jan. 7, 1964 3 Sheets-Sheet 1

INVENTOR.
HENRY B. ROSE
BY
ATTORNEYS

March 1, 1966 H. B. ROSE 3,237,528
FLUID PRESSURE ROTARY VANE ACTUATOR
Filed Jan. 7, 1964 3 Sheets-Sheet 2

INVENTOR.
HENRY B. ROSE
BY *Kenway, Jenney &*
*Hildreth*
ATTORNEYS

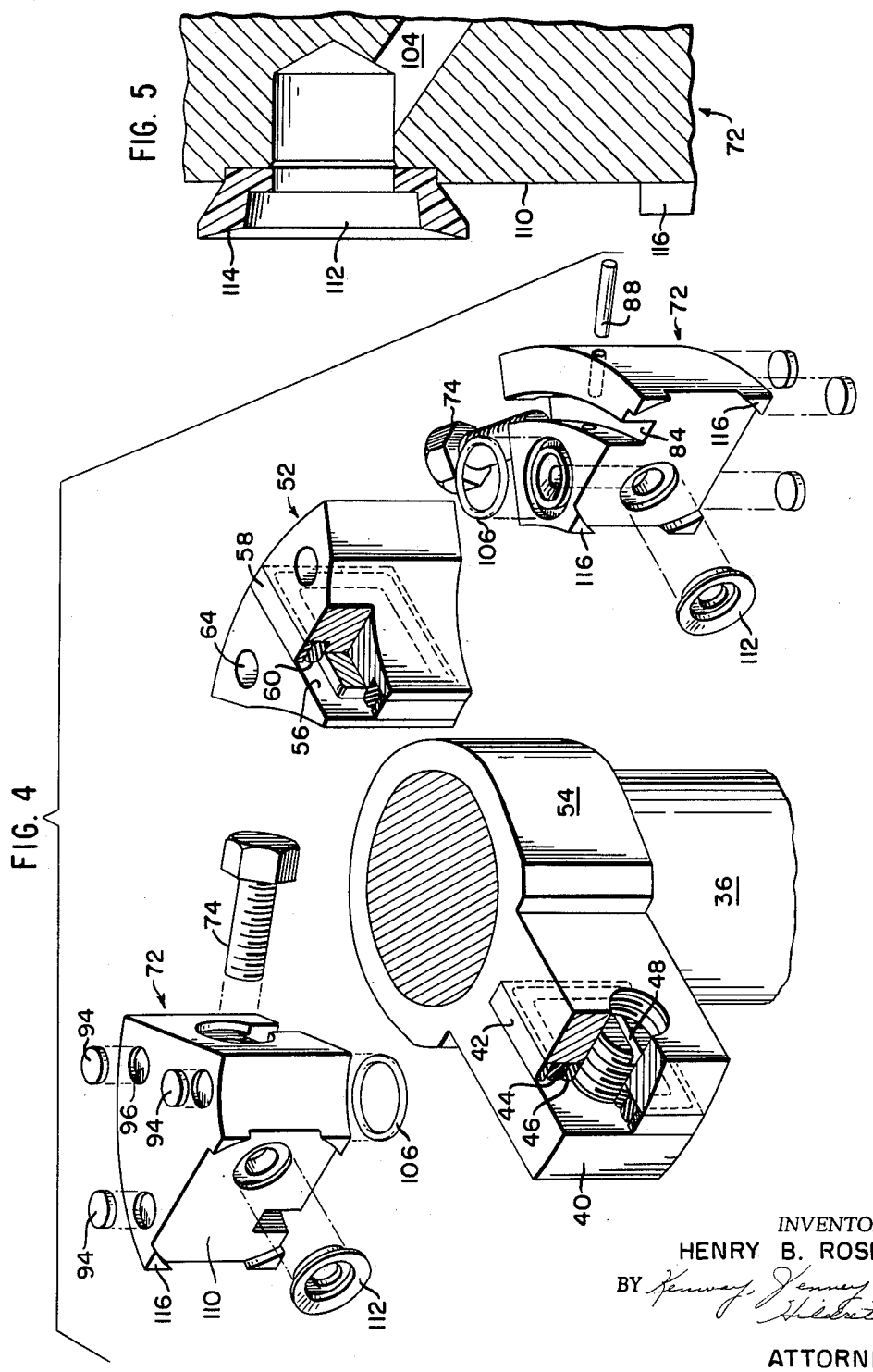

United States Patent Office 3,237,528
Patented Mar. 1, 1966

3,237,528
FLUID PRESSURE ROTARY VANE ACTUATOR
Henry B. Rose, Shrewsbury, Mass., assignor to Jamesbury Corp., Worcester, Mass., a corporation of Massachusetts
Filed Jan. 7, 1964, Ser. No. 336,308
8 Claims. (Cl. 91—409)

The present invention relates to actuating means for valves, and more particularly to actuators of the rotary vane type operating by fluid pressure.

For the remote or servo operation of rotary ball valves and plug valves, actuating means capable of generating substantial torque is required, particularly where the valve is of large flow capacity or is required to operate under high pressure differential. Actuating mechanism of the rotary vane type is well adapted for this purpose in view of its compactness, capability of direct coupling to the rotary valve element and readily reversible direction.

The present invention is concerned with improvements in rotary vane actuators in respect to the accuracy with which the valve may be set in open and closed position and with minimizing flow leakage when the actuator is at either limit position. Valves of the ball and rotary plug types customarily have the flow passage through the rotary element as large as possible consistent with proper shut-off in closed position. It is essential, therefore, that the valve element be accurately positioned both in closed position for complete shut-off and in open position so that the flow passage will be smooth. As the rotary element does not inherently possess limit stops, as does a gate valve for example, it is desirable that the actuator itself be capable of opening and closing the valve to accurate positive limits.

In many applications involving hydraulically powered rotary vane valve actuators, it is a requirement that the fluid pressure be continuously applied while the valve remains in its open and closed positions. As a consequence there is likely in conventional constructions to be continuous leakage past the actuator vane, with resulting wear on the actuator parts and dissipation of energy by the pump.

It is, therefore, an object of the present invention to provide an improved valve actuator of the rotary vane type wherein the valve position in both open and closed positions may be accurately determined by precisely adjustable positive stop means within the actuator.

It is also an object of the invention to provide a rotary vane valve actuator wherein leakage through the actuator is automatically and effectively prevented when the actuator is at either limit position, so that the actuator is capable of withstanding prolonged high static pressure.

In accordance with these and other objects, a feature of the invention involves the provision in a rotary vane actuator of arcuately adjustable internal limit stops having screw threaded means for precise adjustment, with said stops incorporating flow discharge passages which are automatically closed by the vane when the latter is in its limit position determined by the block adjustment.

Other features which aid in achieving leak-free performance even under extremely high fluid pressure will appear in the course of the following description, taken in conjunction with the accompanying drawings in which:

FIG. 4 is an exploded isometric view of the actuator, showing the vane, the abutment and the stop blocks with the actuator body omitted.

FIG. 5 is an enlarged sectional detail of a portion of a stop block in the vicinity of the outlet passage, showing the seal element.

Figure 1:
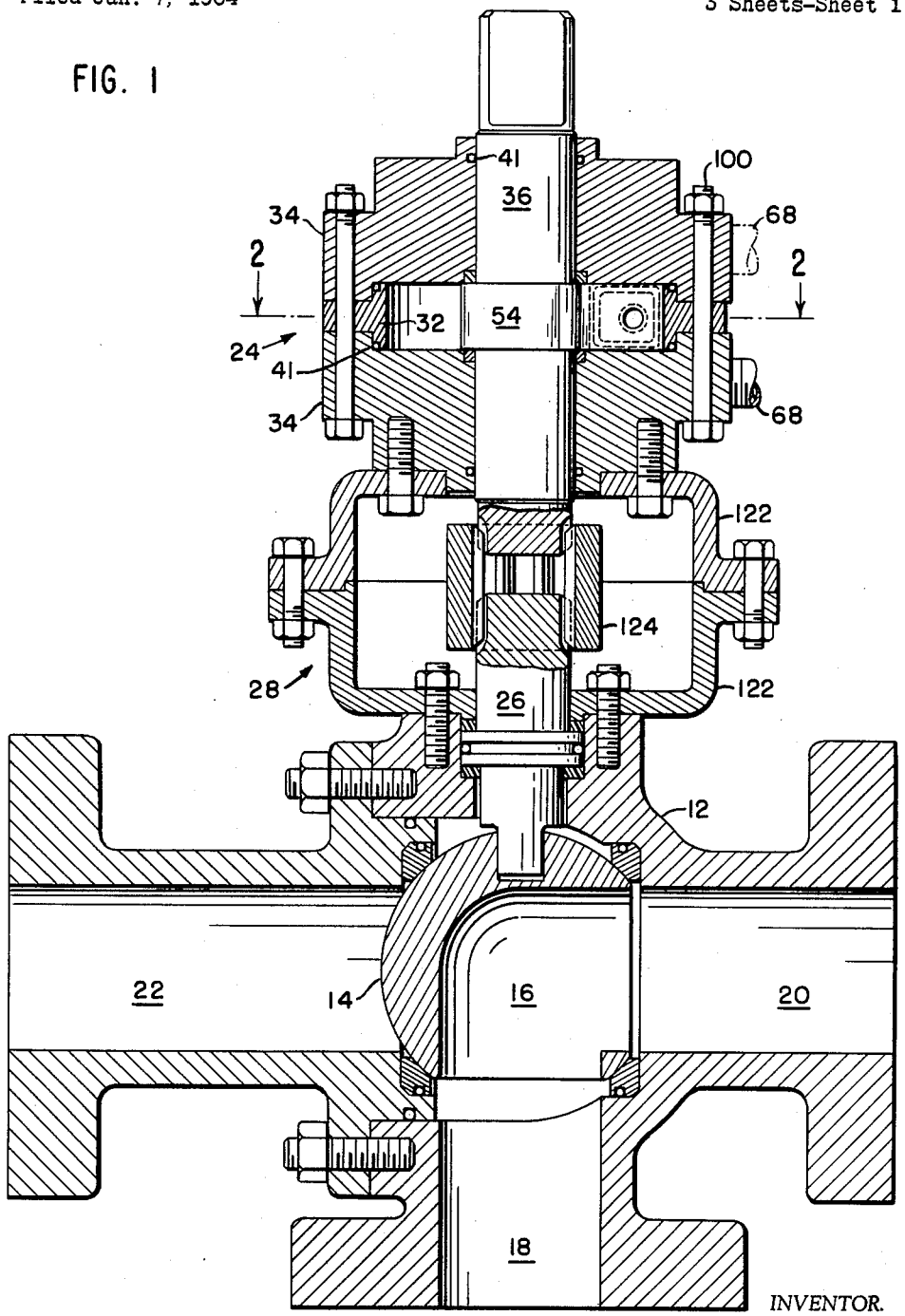
FIG. 1 is a view in sectional elevation showing the actuator of the present invention coupled to and mounted for purposes of illustration on a three-way ball valve.

The valve actuator is illustrated in the upper portion of FIG. 1 and is shown mounted on a three-way ball valve comprising a two piece body 10, 12, and a valve ball 14, the valve ball having a right angle passage 16 to provide flow communication between ports 18 and 20 when in the position shown, or between ports 18 and 22 when turned 180° about its axis of rotation. The actuator, indicated generally at 24, is mounted on the valve body 12 and rotatably connected to ball rotating shaft 26 by coupling and mounting structure indicated generally at 28 and hereinafter described.

The actuator comprises a cylindrical body 32 secured between end plates 34 within which the actuator shaft 36 rotates. For applications where the actuator is to be operated under extremely high pressures, the end plates are preferably of relatively massive construction, as illustrated. The actuator shaft carries a vane 40 (see also FIG. 4) which swings within the annular chamber defined by the cylindrical body 32 and end plates 34. Suitable seals 41 are provided between end plates and body and at the shaft journals to prevent leakage of fluid. For the vane, a sliding seal is provided by the use of a rectangular element 42 of Teflon or equivalent material, backed by a resilient member 44 and center plate 46, these three elements being positioned within a slot in the vane by set screw 48 so that the Teflon is urged into sliding sealing engagement with the walls of the annular chamber.

An abutment block 52 having an arcuate outer portion to conform to the curvature of the annular body 32 is secured within the annular chamber and is provided with sealing means best shown in FIG. 4 to provide a fluid barrier within the chamber in cooperation with the hub 54 of the rotating vane 40. A slot 56 rectangular in configuration is formed around the block. Within this slot is disposed a rectangular Teflon ring 58, backed by a resilient element 60 to provide a fixed seal against the end plates and annular body and a sliding seal relative to the hub portion 54 of the vane. Pins 62 extend through holes 64 in the abutment block 52 into recesses in the end plates 34 to secure the block within the annular chamber intermediate the ports 66 for the hydraulic fluid.

The abutment block serves to fill the space in the annular chamber between the walls thereof and the hub of the vane, with the result that fluid admitted through one of the ports 66 will enter the space between one side of the block and the vane to rotate the vane and shaft in one direction while fluid escapes through the other port as the volume in the chamber on the other side of the block decreases. By reversing the direction of fluid flow within pipes 68 connected to a suitable high pressure pump and flow controls (not shown), the vane may be swung in the opposite direction to its other limit position.

In accordance with the present invention, the limit positions of the vane, and likewise the limit positions of the valve ball, are determined with precision through the use of adjustable stop blocks 72 within the chamber on each side of the fixed abutment. These stop blocks, like the abutment block, are of generally arcuate configuration to conform to the annular chamber between body 32 and vane hub 54.

Figure 2:
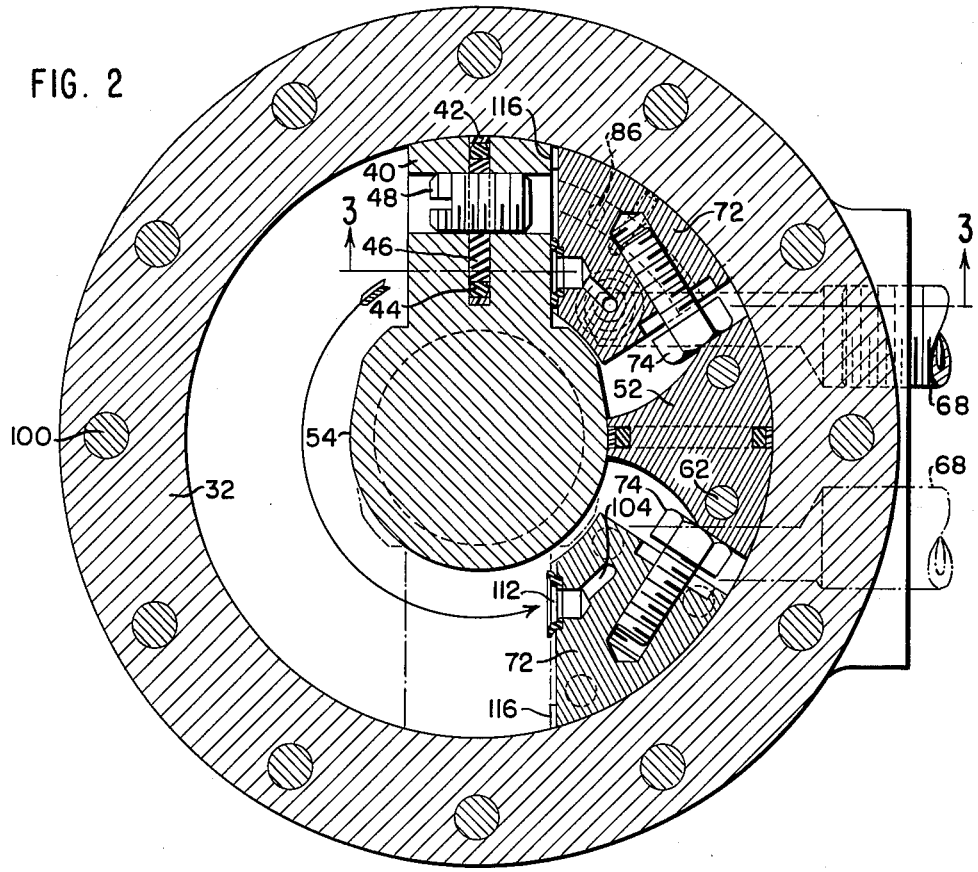
FIG. 2 is a sectional plan view of the actuator perpendicular to the axis of the actuator, taken on the line 2—2 of FIG. 1.
Figure 3:
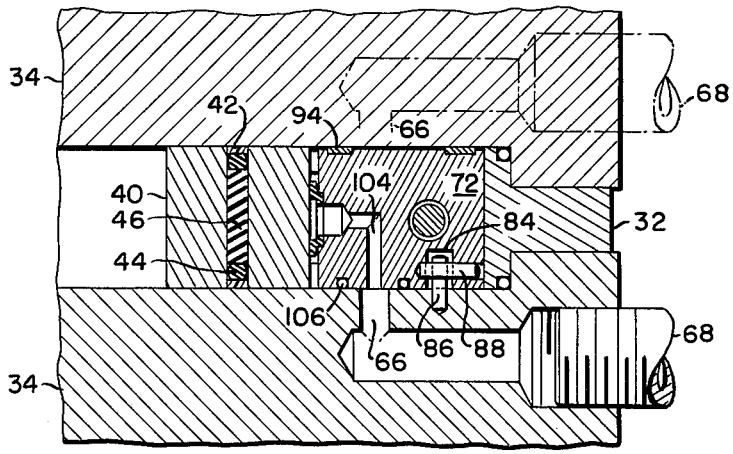
FIG. 3 is a detail view in sectional elevation, taken on the line 3—3 of FIG. 2.

The stop blocks are provided with adjusting means comprising threaded members received in threaded bores in the blocks. The members are preferably cap screws having heads 74 to permit convenient rotation by a suitable wrench when one end plate 34 of the actuator body is removed to provide access. The heads of the cap screws bear against the abutment block 52 as best shown in FIG. 2 so as to provide accurate and positive positioning of the stop blocks in arcuate spaced relation to the fixed abutment.

To prevent displacement of the stop blocks beyond the designed range of adjustment provided by the cap screws 74, the blocks are arcuately grooved at 84 to receive with slight clearance a stop pin 86 secured in end plate 34. Another stop pin 88 secured in the stop block extends across the groove to intersect pin 86 at the desired limit of motion of the stop block away from fixed abutment 52.

When the stop blocks have had their cap screws adjusted to the proper setting for the blocks and the end plate has been reassembled, the stop blocks are effectively clamped within the chamber through the provision of crushable discs 94 of brass or like material which are positioned in shallow recesses 96 on a side face of the blocks, as best shown in the upper left hand portion of FIG. 4. These discs are slightly thicker than the depth of the recesses so as to project initially above the surface of the blocks. During the tightening of the through bolts 100 for the actuator body, the discs will crush as required to permit the end plates to reach tightly clamped condition against annular body 32, thereby securing the stop blocks 72 between the end plates 34.

The stop blocks are provided with flow passages 104 which communicate with the passages 66 in the end plates 34 over the required range of adjustment of the stop blocks, the passage 66 being of appropriate size for this purpose. Seals 106 surround the passages in the side faces of the block adjacent end plate passages 66 and opposite the side having the crushable inserts 94, thereby insuring that proper clamping pressure is applied to the seal rings 106.

The fluid passages 104 communicate with the end faces 110 of the stop blocks so as to open into the annular chamber within which the vane 40 operates. Within a recess surrounding the passage opening in each end face 110 is positioned a resilient sealing member 112, best shown in the enlarged detail view, FIG. 5. These sealing members are formed with a slightly cupped outer flange portion which stands free of the stop block surface 110.

The purpose of these resilient sealing elements in the stop blocks is to provide an effective and automatic shut-off to prevent the escape of fluid from the chamber on the downstream side of the vane, when the actuator vane reaches the limit of its throw. It will be observed, in FIGS. 4 and 5, that the end surfaces 110 of the stop blocks are recessed relative to corner regions or abutments 116. These corner portions provide positive limit stops against which the vane comes to rest under the hydraulic pressure applied to the chamber on the other side of the vane. By making the projecting flange portion 114 of the resilient seals 112 somewhat deeper than the corner stops 116, the face of the actuator vane engages the flange of the seal prior to coming to rest against the corner stops outwardly of the seal. As a result, the vane automatically seals off further flow discharge through passages 104, 66 back to the pump and the pressure differential across the vane seal is reduced substantially to zero, thereby greatly reducing pump power and relieving the vane seal of the effects of continuous fluid pressure and resulting leakage. The vane is nevertheless held in its limit position by the effective fluid pressure applied over an area represented by the area of the flange region of the seal 112.

It is thus apparent that the actuator vane, and therefore the valve ball 116, may quickly and accurately be rotated from one predetermined position to the other by reversing the fluid flow through supply lines 68. Assuming the parts to be initially as shown in full line in FIG. 2, the application of fluid pressure to the upper of the two pipes will cause vane 40 to move away from the upper stop block as fluid enters through passages 66 and 104. When the vane swings in counter-clockwise rotation, fluid in advance of the vane is swept from the chamber and returned to the pump or sump (not shown) through the lower pipe. As the vane approaches the limit of its counter-clockwise rotation, it first engages the flange 114 of the resilient seal 112 and then comes to rest against the corner abutments 116, thereby preventing crushing of the seal and providing an accurate stop limit in the 180° position, represented by the dot and dash outline. By suitable adjustment of the individual cap screws, the settings of the stop blocks may be adjusted to provide the precise limit positions for correct alignment of the valve ball 16 in relation to the flow passages 20, 22. By reason of the described construction of adjustable stop blocks with integral flow shut-off means, the downstream flow passage in the actuator chamber is automatically closed by the vane in its limit positions, for all settings of the stop blocks, since the resilient sealing elements are maintained in predetermined relation to the positive abutment areas 116 on the stop blocks.

Through the provision of the automatic sealing in the limit positions of the vane, it becomes practical to provide a rotary vane of actuator in which extremely high fluid pressures may be employed, thereby enabling relatively large ball valves to be operated by compact directly-connected actuators. Thus, as shown in FIG. 1, the actuator 24 may be mounted on the valve body 10 by means of a split housing 122, within which the actuator and ball valve stub shafts are joined by a splined sleeve 124 for convenient assembly and disassembly.

While the invention has been described in relation to the operation of a ball valve, it will be understood that the several features of the invention may be employed to advantage in actuators for other types of valves requiring high torque and precise limits, as well as devices other than valves where powerful and precise rotary movement is required between accurate limits.

I claim as my invention:

1. A fluid pressure rotary vane actuator comprising a body having a circular chamber, a shaft disposed axially of said chamber, a vane carried by said shaft, sliding fluid seal means intermediate the vane and chamber body, an abutment fixed within the chamber providing a fluid barrier between one side of the vane and the other, fluid passages through the body communicating with the chamber on each side of the abutment, stop blocks on each side of the fixed abutment for limiting movement of the vane toward the abutment, said blocks having adjustable means interposed between blocks and abutment to provide predetermined limits of motion of the vane within the chamber, fluid passages in the stop blocks communicating with the chamber on the vane side of the stop blocks, said passages communicating with the fluid passages through the body over the range of adjustment of the stop blocks within the chamber, and resilient sealing means surrounding the fluid passages on the vane side of the stop blocks, said sealing means being engaged by the vane to seal the fluid passage in said stop block when the vane is in limit position against said stop block.

2. A fluid pressure rotary vane actuator comprising a body having a circular chamber, a shaft disposed axially of said chamber, a vane carried by said shaft, sliding fluid seal means intermediate the vane and chamber body, an abutment fixed within the chamber providing a fluid barrier between one side of the vane and the other, fluid passages through the body communicating with the chamber on each side of the abutment, stop blocks on each side of the fixed abutment for limiting movement of the vane toward the abutment, said blocks having adjustable means interposed between blocks and abutment to provide predetermined limits of motion of the vane within the chamber, fluid passages in the stop blocks communicating with the chamber on the vane side of the stop blocks, said passages communicating with the fluid passages through the body over the range of adjustment of the stop blocks within the chamber, resilient sealing means surrounding the fluid passages on the vane side of the stop blocks, said sealing means being engaged by the vane to seal the fluid passage in said stop block when the vane is in limit position against said stop block, said stop blocks having positive abutment means engaged by the vane in limit position when the vane is in resilient sealing engagement with the passage-sealing means.

3. A fluid pressure rotary vane actuator comprising a body having a circular chamber within a circular outer wall and spaced side walls, a shaft extending through said chamber coaxially thereof, a vane carried by said shaft, said vane having a circular hub portion, an abutment secured within the chamber between vane hub and circular outer wall of the chamber providing a fluid barrier between one side of the vane and the other, said abutment having a narrow marginal portion adjacent the vane hub and a relatively wider arcuate marginal portion adjacent the curved outer wall of the chamber, at least a portion of the margins of the abutment intermediate the hub and outer portions being generally radially directed, stop blocks of generally arcuate configuration within the circular chamber on each side of the abutment, and headed screw-threaded members disposed generally tangentially of the stop blocks with their heads against the radial portions of the abutment for positioning the stop blocks in adjustable spaced relation to the abutment.

4. A fluid pressure rotary vane actuator comprising a body having a circular chamber within a circular outer wall and spaced side walls, a shaft extending through the chamber coaxially thereof, a vane carried by the shaft and having a circular hub portion, an abutment within the chamber between hub and outer wall providing a fluid barrier between one side of the vane and the other, stop blocks on each side of the vane, said blocks being adjustable toward and from the abutment for positioning the vane in its limit positions, said stop blocks being of arcuate configuration and having an arcuate groove in one face abutting a side wall of the body, pins carried by the said side walls and extending into the arcuate groove in each stop block, and stop means in the groove for limiting movement of the stop blocks away from the abutment.

5. A fluid pressure rotary vane actuator comprising spaced end plates and an annular body therebetween forming a circular chamber having spaced side walls, clamping means for securing the end plates to the annular body, a shaft extending through the chamber coaxially thereof, a vane carried by the shaft and having a circular hub portion, an abutment within the chamber between hub and outer wall providing a fluid barrier between one side of the vane and the other, stop blocks on each side of the vane, said blocks being adjustable toward and from the abutment for positioning the vane in its limit positions, said stop blocks having a thickness in a direction axially of the chamber slightly less than the spacing between the side walls thereof, the blocks having recesses in at least one face adjacent a side wall of the chamber, and inserts of crushable material in said recesses, said inserts projecting slightly beyond the surface of the adjacent side faces of the stop blocks for tightly clamping the stop blocks between the side walls of the chamber when the end plates are clamped to the annular body.

6. A fluid pressure rotary vane actuator comprising a body having a circular chamber, a shaft disposed axially of said chamber, a vane carried by said shaft, sliding fluid seals means intermediate the vane and chamber body, an abutment fixed within the chamber providing a fluid barrier between one side of the vane and the other, fluid passages through the body communicating with the chamber on each side of the abutment, stop blocks on each side of the fixed abutment for limiting movement of the vane toward the abutment, said stop blocks being arcuately adjustable toward and from the abutment on each side thereof, each block having a face on its vane side that is generally parallel to the vane when the vane is adjacent said block, said vane side of the block including abutment means which is engaged by the vane at the limit of motion of the vane in the direction of said block, and a fluid passage in each stop block opening into the chamber through the face on the vane side of the block, said passages communicating with the fluid passages through the body over the range of arcuate adjustment of the stop blocks toward and from the abutment.

7. A fluid pressure rotary vane actuator comprising a body having a circular chamber, a shaft disposed axially of said chamber, a vane carried by said shaft, sliding fluid seal means intermediate the vane and chamber body, an abutment fixed within the chamber providing a fluid barrier between one side of the vane and the other, fluid passages through the body communicating with the chamber on each side of the abutment, stop blocks on each side of the fixed abutment for limiting movement of the vane toward the abutment, said stop blocks being arcuately adjustable toward and from the abutment on each side thereof, each block having a face on its vane side that is generally parallel to the vane when the vane is adjacent said block, said vane side of the block including abutment means which is engaged by the vane at the limit of motion of the vane in the direction of said block, and a fluid passage in each stop block opening into the chamber through the face on the vane side of the block, said passages communicating with the fluid passages through the body over the range of arcuate adjustment of the stop blocks toward and from the abutment, said passage opening in the vane side of the block being closed by the vane when the vane is in contact with the abutment means on said block.

8. A fluid pressure rotary vane actuator comprising a body having a circular chamber, a shaft disposed axially of said chamber, a vane carried by said shaft, sliding fluid seal means intemediate the vane and chamber body, an abutment fixed within the chamber providing a fluid barrier between one side of the vane and the other, fluid passages through the body communicating with the chamber on each side of the abutment, stop blocks on each side of the fixed abutment for limiting movement of the vane toward the abutment, said stop blocks being arcuately adjustable toward and from the abutment on each side thereof, each block having a face on its vane side that is generally parallel to the vane when the vane is adjacent said block, a fluid passage in each stop block opening into the chamber through the face on the vane side of the block, said passages communicating with the fluid passages through the body over the range of arcuate adjustment of the stop blocks toward and from the abutment, a resilient seal in the stop blocks, said seals having an opening therethrough and including a portion extending into recessed relation within the end of the passage in the stop block adjacent the chamber end thereof and a resilient flange portion outwardly thereof and overlying the face of the stop block, the vane and stop block having cooperating rigid abutment surfaces outwardly of the resilient seal means, said abutment surfaces coming into contact, upon motion of the vane toward the stop block, to position the vane in predetermined spaced relation to the adjacent face of the stop block with the flange of the resilient seal in sealing engagement with the vane while preventing the flange from being crushed between vane and block, over the range of adjustment of the stop blocks.

References Cited by the Examiner

UNITED STATES PATENTS

| | | | |
|---|---|---|---|
| 2,778,338 | 1/1957 | Shafer | 92—125 |
| 2,811,142 | 10/1957 | Shafer | 92—125 |
| 3,021,822 | 2/1962 | Rumsey | 92—125 |

SAMUEL LEVINE, *Primary Examiner.*

FRED E. ENGELTHALER, *Examiner.*